Nov. 19, 1935.  J. M. PATTERSON  2,021,868
FLUID TIGHT PACKING JOINT
Filed Feb. 4, 1935
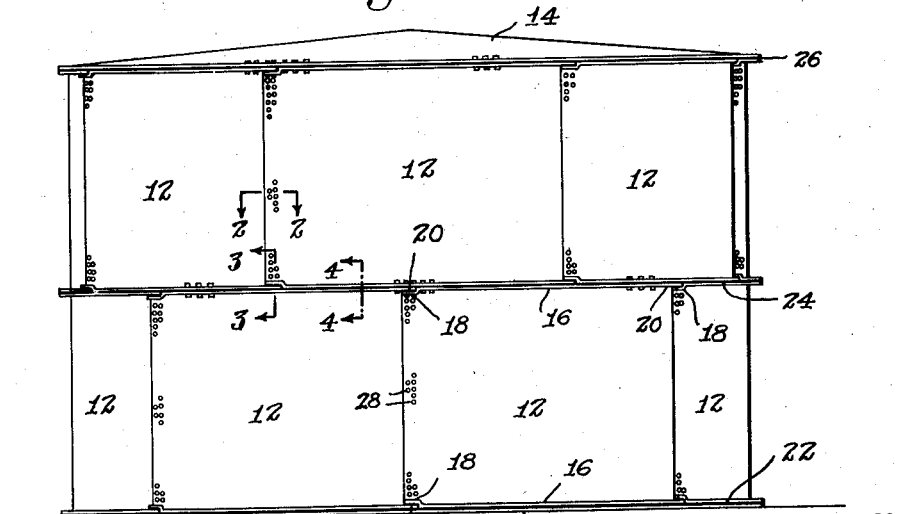
Inventor
JAMES M. PATTERSON Patented Nov. 19, 1935

2,021,868

UNITED STATES PATENT OFFICE 2,021,868

FLUID-TIGHT PACKING JOINT

James M. Patterson, Waban, Mass., assignor to Boston Woven Hose and Rubber Company, Cambridge, Mass., a corporation of Massachusetts Application February 4, 1935, Serial No. 4,796

4 Claims. (Cl. 154—45.5)

This invention relates to fluid-tight packing joints and more especially to such joints as employed in sectional bolted tanks for use in containing gasoline and other liquids. The oil industry requires for its use sectional tanks which can be readily and conveniently assembled in the field and which, when thus assembled, will be tight against the leakage and loss of the contents thereof transversely through the joints between the several sections. Heretofore, packing material for these joints has embodied fabric sheets of open woven cotton or the like having threads running both longitudinally and transversely therethrough, the sheet or sheets being embedded within and between two or more plies of rubber, all vulcanized into a unit.

In order to prevent leakage between juxtaposed surfaces and the resulting fire risk, a packing should be compressible and sufficiently resilient, when compressed between two surfaces which it is desired to render fluid proof, to be capable of filling the irregularities of such surfaces so as effectively to prevent seepage or leakage of fluids between the packing and either surface. The packing should furthermore be substantially non-stretchable and strong enough to permit handling thereof and placing to produce the joints without weakening the packing in any portion thereof or varying its uniform thickness. The packing material heretofore used satisfactorily fills these requirements but has the disadvantage when put into use, particularly under conditions wherein the fluid to be contained is heated or placed under pressure, that the fluid tends, by capillary action and otherwise, to seep transversely through the fabric ply or plies along the transverse threads thereof, and finally to penetrate the entire packing and cause substantial leakage. Various expedients have been tried for eliminating this difficulty, one of them being to treat the fabric with substances rendering it impervious to liquids such as gasoline. This treatment, however, is expensive and has not resulted in the production of a satisfactory and leak-proof joint.

My invention herein disclosed contemplates an impervious and leak-proof joint of this general nature which is economical to produce and wherein the disadvantage above discussed and any necessity for specially treating the fabric to prevent leakage are eliminated and also wherein all the advantages incident to the packing above defined are retained. This improved joint embodies the use of a resilient packing of rubber or the like having threads or cords incorporated therein and arranged to extend therethrough in a direction longitudinally, or generally longitudinally, of the strip and joint, the transverse threads present in the previously-known packing being eliminated in the packing of this improved joint. The threads may be of cotton yarn or other suitable material, whether or not the same are susceptible of capillary action, since in the improved joint the threads run longitudinally of the strip and joint and no thread passes from the inside to the outside surfaces of the packing or crosses another so as to provide a path of seepage for the liquid contained in the tank. The packing is, therefore, impervious to the passage of fluid transversely therethrough and the resiliency of the packing permits the opposing faces of the joint elements to be drawn into compressing contact therewith and thus eliminates leakage of fluid between such faces and the packing. The production of a new and improved fluid-tight joint of this nature comprises the primary object of my invention.

These and other features of the invention will be best understood and appreciated from the following description of a preferred embodiment thereof, selected for purposes of illustration and shown in the accompanying drawing, in which Fig. 1 is an elevation of a sectional bolted metal tank employing my invention;

Fig. 2 is an enlarged fragmentary sectional view taken on line 2—2 of Fig. 1;

Fig. 3 is an enlarged fragmentary sectional view taken on line 3—3 of Fig. 1;

Fig. 4 is an enlarged fragmentary sectional view taken on line 4—4 of Fig. 1;

Fig. 5 illustrates a portion of straight packing used in my improved joint;

Fig. 6 illustrates a portion of curved packing; and

Fig. 7 illustrates a portion of a somewhat modified form of curved packing.

In Fig. 1 is illustrated a sectional bolted metal of the type used in oil fields for containing oil, gasoline and the like, the tank embodying a bottom 10, side wall staves or sections 12 and a roof 14. The top and bottom edge portion of each stave 12 is bent over to provide flanges 16. Both flanges of each stave are bent inwardly at one end 18 thereof to provide a male end adapted to fit within and between the flanges of the adjacent and cooperating stave at 20 and the body portion of each of said ends is bent outwardly at 19, thus producing overlapping joints at and between the ends of the adjacent sections.

The bottom flanges of the lowermost ring of staves rests on the bottom wall 10 of the tank whereby producing a joint 22 therebetween, and the top and bottom flanges of adjacent sections cooperate to produce a joint 24 therebetween. The roof 14 likewise cooperates with the top flanges of the topmost ring of staves to produce a joint 26 therebetween. The flanges and other portions cooperating to produce the joints are provided with bolt holes and bolts 28 passing therethrough which serve to compress and hold the parts together.

It will be obvious that the cooperating surfaces of the flanges 16 cannot be made and kept sufficiently accurate and smooth to provide a metal-to-metal leak-proof joint and that suitable packing must be provided between these cooperating surfaces. As has been hereinabove described, packing embodying woven fabric sheets incorporated within and between two plies of rubber vulcanized thereto has heretofore been used for this purpose. Such material has effectively prevented leakage between the flange surfaces and the packing but has not been so effective to prevent leakage through the packing itself, for reasons hereabove stated. The object of my invention herein is to produce a joint which will retain all the advantages of this previously known joint and at the same time remedy the failure thereof by preventing the said leakage through the packing.

In Fig. 5 I have illustrated a portion of straight packing embodying my invention and comprising a strip 30 of rubber having threads or cords 32 incorporated within and extending longitudinally of and parallel therewith, the strip being vulcanized into a unit with the threads and having bolt holes 34 therethrough. This strip is of a very flexible, resilient and compressible nature whereby it will readily adapt itself to use in curved joints where the arc of curvature is relatively large, as, for example, in sectional storage tanks of the type shown in Fig. 1. In such use the packing strip is placed between the surfaces cooperating to produce the joint, is drawn into place and the bolts 28 are passed through the aligned bolt holes of the two metal elements and the packing strip therebetween. This handling and placing requires certain tightening and drawing of the packing into position, as will be understood, and it will be apparent that the threads provide such reinforcement as to preclude any stretching of the strip or any weakening or thinning thereof in portions to destroy the uniform thickness which is necessary effectively to serve the leak-proof function. It will be understood that the packing extends continuously around the tank horizontally to produce the joints at 22, 24 and 26 and that the packing likewise extends vertically at 38 to produce the joints between the cooperating ends of adjacent staves 12. The end portions 40 of the packing 38 furthermore extend horizontally outward, as shown in Fig. 3, to fill the space between the telescoped ends 18 and 20 of the adjacent staves. When the nuts 36 are tightened the opposed metal surfaces are drawn into compressing contact with the packing strip, which is thereupon forced into the irregularities of the metal surfaces whereby preventing seepage or leakage of fluid between the packing and such surfaces. It will furthermore be apparent that seepage cannot take place through the body of the packing since the rubber is impervious to such action and there are no transverse threads or paths along which the fluid might pass through such body.

In some cases, as, for example, where the packing is to be used in curved joints having a relatively small arc of curvature, it may be desirable to use a curved packing strip in lieu of the straight strip shown in Fig. 5. I have shown such a strip in Fig. 6 wherein threads or cords 42 are incorporated within the rubber body 44 of the strip and extend longitudinally therethrough parallel with the strip, bolt holes 46 also being provided through the strip. Also, while I prefer that the threads shall pass longitudinally through the strip parallel therewith, as indicated in Figs. 5 and 6, it will be apparent that the object of the invention might well be accomplished by extending the threads through the strip in a direction generally longitudinally thereof in a manner avoiding any thread or path for the passage of fluid transversely through the packing. For example, in Fig. 7 I have illustrated a curved packing strip 48 of limited length having threads 50 therethrough extending in a direction generally longitudinally of the strip, it being apparent that none of the threads pass transversely through the strip from one edge 52 thereof to the opposite edge 54, and furthermore that none of the threads cross each other. This strip has bolt receiving holes 56 therethrough and is used in like manner as the strips shown in Figs. 5 and 6 except that the strips 48, being of a limited length, will need to be suitably overlapped at the ends when forming continuous joints or joints longer than the strip.

Having thus described my invention, what I claim as new and desire to secure by Letters Patent is:

1. In a joint for fluid-containing tanks having cooperating sections with edge portions thereof in overlapping relation and means cooperating with said overlapping portions to draw them together, an elongated and compressible packing strip characterized by the fact that the said packing strip includes in its structure rubber or like impervious material having a plurality of threads embedded therein and extending only in a direction generally longitudinally of the strip and said edge portions whereby to eliminate any pathway for leakage of fluid between said portions transversely of the strip.

2. In a joint for fluid-containing tanks having cooperating sections with edge portions thereof in overlapping relation and means cooperating with said overlapping portions to draw them together, an elongated and compressible packing strip characterized by the fact that the said packing strip includes in its structure rubber enclosing and vulcanized about a plurality of fabric threads extending only in a direction generally longitudinally of the strip and said edge portions whereby to eliminate any pathway for leakage of fluid between said portions transversely of the strip.

3. In a joint for fluid-containing tanks having cooperating sections with edge portions thereof in overlapping relation and means cooperating with said overlapping portions to draw them together, an elongated and compressible packing strip characterized by the fact that the said packing strip includes in its structure rubber or like impervious material having a plurality of threads embedded therein and extending therethrough only in direction longitudinally of and parallel with the strip and said edge portions whereby to eliminate any pathway for the leakage of fluid between said portions transversely of the strip.

4. In a joint for sectional fluid-containing tanks having cooperating sections with edge portions thereof in overlapping relation and means cooperating with said overlapping portions to draw them together, an elongated and compressible packing strip characterized by the fact that the said packing strip includes in its structure rubber or like impervious material having oppositely disposed flat and parallel faces with a plurality of fabric threads wholly enclosed within the strip between said faces and extending only in a direction generally longitudinally of the strip and said edge portions whereby to prevent leakage of fluid between said portions transversely of the strip.

JAMES M. PATTERSON.